United States Patent
Gaillard et al.

(10) Patent No.: US 9,554,256 B2
(45) Date of Patent: Jan. 24, 2017

(54) METHOD FOR COMMUNICATING TEXT MESSAGES IN DEFERRED MODE OR IN REAL-TIME MODE, CORRESPONDING GENERATING DEVICE AND COMPUTER PROGRAM

(71) Applicant: Orange, Paris (FR)

(72) Inventors: Michel Gaillard, Pleumeur Bodou (FR); Emmanuel Gustin, Saint Quay Perros (FR); Francois Toutain, Louannec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/648,869

(22) PCT Filed: Nov. 25, 2013

(86) PCT No.: PCT/FR2013/052843
§ 371 (c)(1),
(2) Date: Jun. 1, 2015

(87) PCT Pub. No.: WO2014/083265
PCT Pub. Date: Jun. 5, 2014

(65) Prior Publication Data
US 2015/0312735 A1    Oct. 29, 2015

(30) Foreign Application Priority Data

Nov. 30, 2012  (FR) ...................... 1261474

(51) Int. Cl.
*H04M 3/42*  (2006.01)
*H04W 4/14*  (2009.01)
(Continued)

(52) U.S. Cl.
CPC .............. *H04W 4/14* (2013.01); *H04L 12/581* (2013.01); *H04L 51/04* (2013.01);
(Continued)

(58) Field of Classification Search
CPC ....... H04W 4/14; H04W 88/02; H04L 12/581; H04L 51/04; H04M 1/72552; H04M 1/72583; H04M 3/42382
(Continued)

(56) References Cited

U.S. PATENT DOCUMENTS

| 7,555,521 | B1 | 6/2009 | McLaughlin et al. |
| 2004/0267884 | A1* | 12/2004 | Sar-Shalom ...... H04M 1/72547 709/206 |

(Continued)

OTHER PUBLICATIONS

International Search Report and Written Opinion dated Apr. 3, 2014 for corresponding International Application No. PCT/FR2013/052843, filed Nov. 25, 2013.
(Continued)

*Primary Examiner* — Nathan Taylor
(74) *Attorney, Agent, or Firm* — David D. Brush; Westman, Champlin & Koehler, P.A.

(57) ABSTRACT

A method and apparatus are provided for communicating text messages between a first terminal and at least one second terminal that are connected by a communications network. Initially, the terminals communicate according to a first mode in which all the characters of a validated message are transmitted at the validation of said message. Then, the terminals switch into a second communication mode in which each character of a message is transmitted following its introduction on a keypad. The switching from the first mode into the second mode takes place when a terminal, while it is introducing a message, receives at least one signal indicating the introduction of a character on the keyboard of the other terminal.

10 Claims, 3 Drawing Sheets

Figure 1:
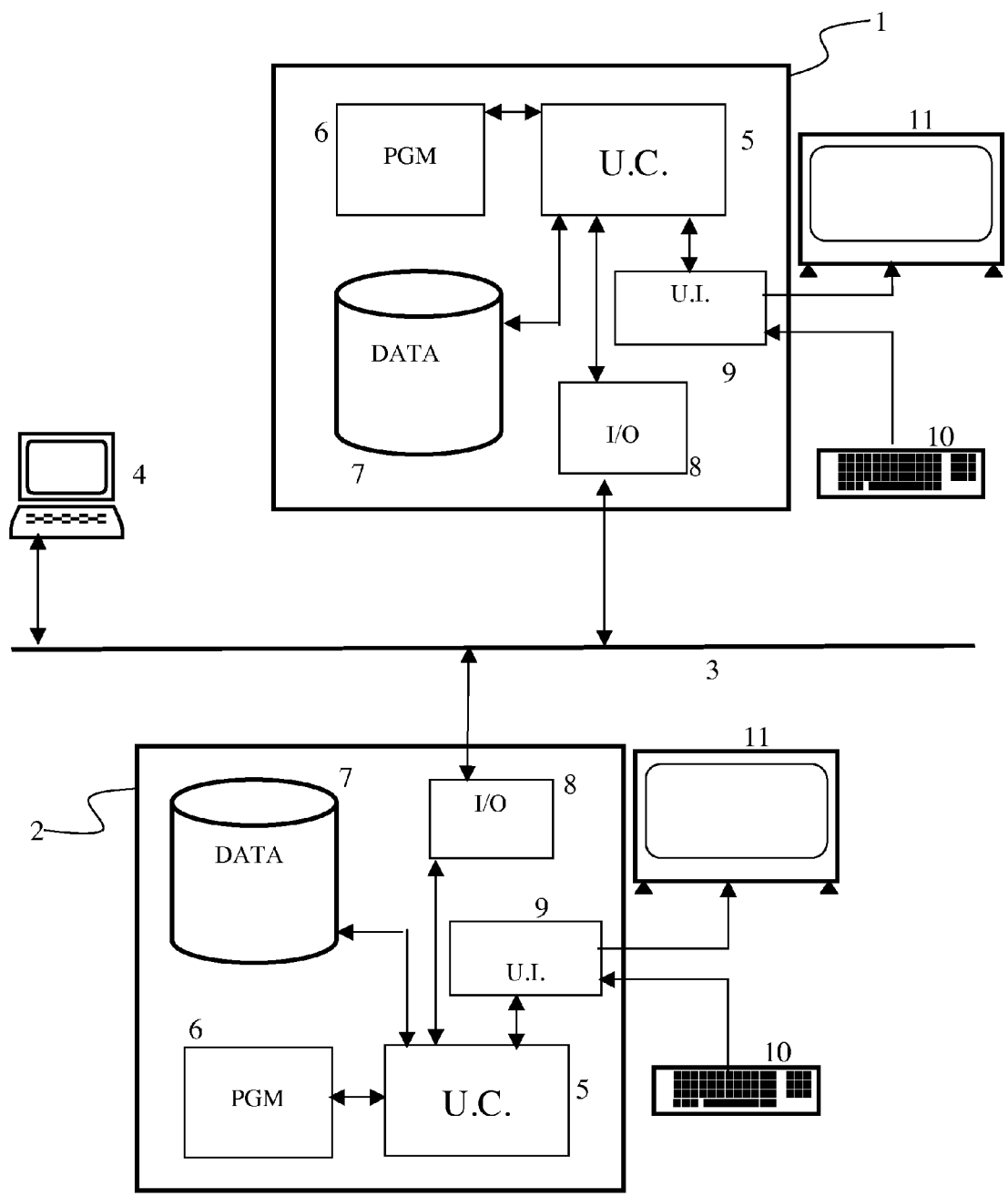

(51) Int. Cl.
*H04L 12/58* (2006.01)
*H04M 1/725* (2006.01)
*H04W 88/02* (2009.01)

(52) U.S. Cl.
CPC ... *H04M 1/72552* (2013.01); *H04M 1/72583* (2013.01); *H04M 3/42382* (2013.01); *H04W 88/02* (2013.01)

(58) Field of Classification Search
USPC ...................................................... 455/414.1
See application file for complete search history.

(56) References Cited

U.S. PATENT DOCUMENTS

| | | | |
|---|---|---|---|
| 2007/0116195 A1* | 5/2007 | Thompson | H04L 12/58 379/67.1 |
| 2008/0043941 A1 | 2/2008 | Tang et al. | |
| 2008/0201438 A1 | 8/2008 | Mandre | |
| 2009/0098893 A1* | 4/2009 | Huang | H04M 1/72547 455/466 |
| 2009/0222523 A1* | 9/2009 | Williams | H04L 51/04 709/206 |
| 2011/0010657 A1* | 1/2011 | Fitzgerald | G06Q 10/10 715/780 |
| 2011/0238734 A1* | 9/2011 | Curry | H04L 12/5895 709/203 |
| 2012/0034897 A1* | 2/2012 | Kreitzer | H04M 3/5116 455/404.1 |
| 2012/0034938 A1* | 2/2012 | Kreitzer | H04L 12/581 455/466 |
| 2013/0065549 A1* | 3/2013 | Sennett | H04W 76/007 455/404.1 |
| 2013/0268605 A1* | 10/2013 | Curry | H04L 12/5895 709/206 |

OTHER PUBLICATIONS

English translation of the International Written Opinion dated Apr. 3, 2014 for corresponding International Application No. PCT/FR2013/052843, filed Nov. 25, 2013.

* cited by examiner

METHOD FOR COMMUNICATING TEXT MESSAGES IN DEFERRED MODE OR IN REAL-TIME MODE, CORRESPONDING GENERATING DEVICE AND COMPUTER PROGRAM

1. CROSS-REFERENCE TO RELATED APPLICATIONS

This application is a Section 371 National Stage Application of International Application No. PCT/FR2013/052843, filed Nov. 25, 2013, the content of which is incorporated herein by reference in its entirety, and published as WO 2014/083265 on Jun. 5, 2014, not in English.

2. FIELD OF THE INVENTION

The field of the invention is that of text communications between at least two terminals belonging to interlocutors. More specifically, the invention relates to the case where the messages exchanged consist of characters and where the interlocutors can enter their texts at the same time by any interfaces whatsoever.

3. PRIOR ART

At present, communications between persons require greater interactivity and ergonomic qualities adapted to different types of exchanges. The devices used may be portable telephones, network-connected computers, wireless tablets or any communications device connected to a display device and having text acquisition means. For the exchanges of text messages, there are at least two modes of communication.

A first mode of communication, called "instant messaging", used for example to transmit text messages or SMS (Short Message System) messages between interlocutors using portable terminals, consists in preparing a sentence or a message and sending it. The sentence or the message in full is transmitted through a network at varying speeds and is received by the recipient's terminal. The recipient then gets to know the message, enters a response and sends it. The first interlocutor then sees the response on his screen and introduces a new message. In this first type of communication, which can be called deferred communication, the remote interlocutor gets to know the message when it has been validated by the sender and sent.

In this mode of communication, each interlocutor must wait for the other to end his message in order to know its contents. Certain message systems visually inform him, using for example an icon that appears on the screen, that the other interlocutor is in the process of entering a message. In this case, the terminal that has a character typed on its keypad sends a signal indicating that a message is being typed. If the code typed is a validation code of the message that has just been inserted, then the terminal sends an information frame containing all the characters of the validated message. The signal indicating that a message is being typed does not give information on the content of the message that is being introduced. This type of communication is fairly frustrating because an interlocutor can thus monopolize his interlocutor's attention by constantly introducing new messages or by entering a very lengthy message.

A second type of communication, using the real-time texting (RTT) technique consists in sending the interlocutor each character as soon as it is entered. In this way, the recipient can immediately know the content of the message being introduced. This second approach gives the impression that the interlocutor is very close by and takes the form of text appearing on the screen. However, the interlocutors, concentrating on what they are entering, often on one part of the screen, generally cannot at the same time read the words and parts of words that often appear in another part of the screen. This causes a de-synchronization of the content of the exchanges, which is contrary to the effect of real-time dialog being sought. In addition, this communication uses a great deal of bandwidth because the messages are exchanged during each character introduced.

One solution provides for automatic switching when the recipient's terminal allows it or manual switching by introducing a command. In this case, the communication starts in deferred mode, since the message is not sent and displayed to the recipient unless it has been validated by the sender. If the recipient's terminal allows real-time communication, then this mode is used and each interlocutor can know what the other interlocutor is introducing into his terminal.

However, this switching does not take account of the interactivity between the users. In certain cases, the users are in a hurry to communicate: having to wait for the message to be validated before it can be seen causes frustration. It can also happen that, during a same dialog, the interlocutors agree to wait for the message to be validated in order to see it and then become more impatient and find the wait far too irksome.

There is therefore a need for a novel technique enabling interlocutors to exchange text messages in adapting to their ways of introducing messages, while optimizing the bandwidth consumed by the data exchange.

4. SUMMARY OF THE INVENTION

The invention proposes a novel solution which does not have all these drawbacks of the prior art in the form of a method for communicating text messages between a first terminal and at least one second terminal that are connected by a communications network. According to a functional aspect, the method comprises a first communication mode in which all the characters of a validated message are transmitted from the first terminal to the second terminal. In this mode, the transmission of all the characters is activated by the validation of said message. The method also comprises a second communication mode in which each character of a message is transmitted from a first terminal to a second terminal when it is introduced into the first terminal. The second communication mode comes into action as a function of the activity of the first terminal and the reception of a signal providing information on the activity of a second terminal.

The invention thus proposes to improve interactivity for messaging and text-exchanging programs in proposing two modes of communication and in switching from one mode to another according to the way in which the messages are introduced.

According to one particular embodiment, the second communication mode comes into action when a message is being introduced on the first terminal and following the reception of a signal indicating the introduction of a character on a second terminal. In this way, the users are more aware of the fact that they are introducing messages at the same time.

According to another embodiment, the second communication mode comes into action after a determined duration during which at least one other activity signal is received by the first terminal. In this way, the switching from one mode to another takes place after a minimum duration.

According to another embodiment, the user introduces a command to switch the first terminal from the second communication mode to the first communications mode. In this way, the user can force passage from one communication mode to another.

According to another embodiment, the switching of the first terminal from the second communication mode to the first communication mode is effected through the absence of an activity signal sent by a second terminal during the introduction of a message in full. In this way, when the interlocutors stop introducing messages at the same time, the communication is done again according to the first mode.

According to a second embodiment, the switching of the first terminal from the second communication mode to the first communication mode is effected through the absence of reception of an activity signal sent by a second terminal for a determined duration. In this way, the return to the first communication mode is done when the interlocutors stop introducing messages at the same time for a certain period of time.

According to another embodiment, a menu for introducing messages is displayed comprising a zone displaying messages being introduced. In the second communications mode, the zone displays the characters introduced into the first terminal and the characters introduced into a second terminal in distinguishing them by a graphic distinction. In this way, the user easily distinguishes the characters that he introduces from the characters that his interlocutor introduces into his terminal.

According to this second embodiment, the presentation of the characters in said zone complies with the chronology of the introduction of the characters into the first terminal and the introduction of characters into a second terminal. In this way, the user easily perceives the chronology of the characters introduced into either of the terminals.

In another embodiment, the switching from the first communication mode to the second communication mode of a terminal activates the sending by this terminal of a signal informing the at least one second terminal that it is to switch into the second communications mode. In this way, all the terminals communicate in the same way and at the same time.

According to another hardware aspect, the invention proposes a communications terminal comprising a means of communication with at least one other terminal through a communications network and a means for introducing characters for creating messages to be transmitted to at least one other terminal, characterized in that said terminal has two communications modes available, a first mode consisting in transmitting all the characters when the message is validated by the means for introducing, a second communication mode consisting in transmitting each character when it is introduced into the means for introducing, the second communication mode coming into play according to the activity of the terminal and the reception of a signal by the communications means providing information on the activity of at least one other terminal.

According to this other aspect, the invention also relates to a computer program comprising instructions to implement the communications method described here above when the program is executed by a processor.

5. LIST OF FIGURES

Figure 2:
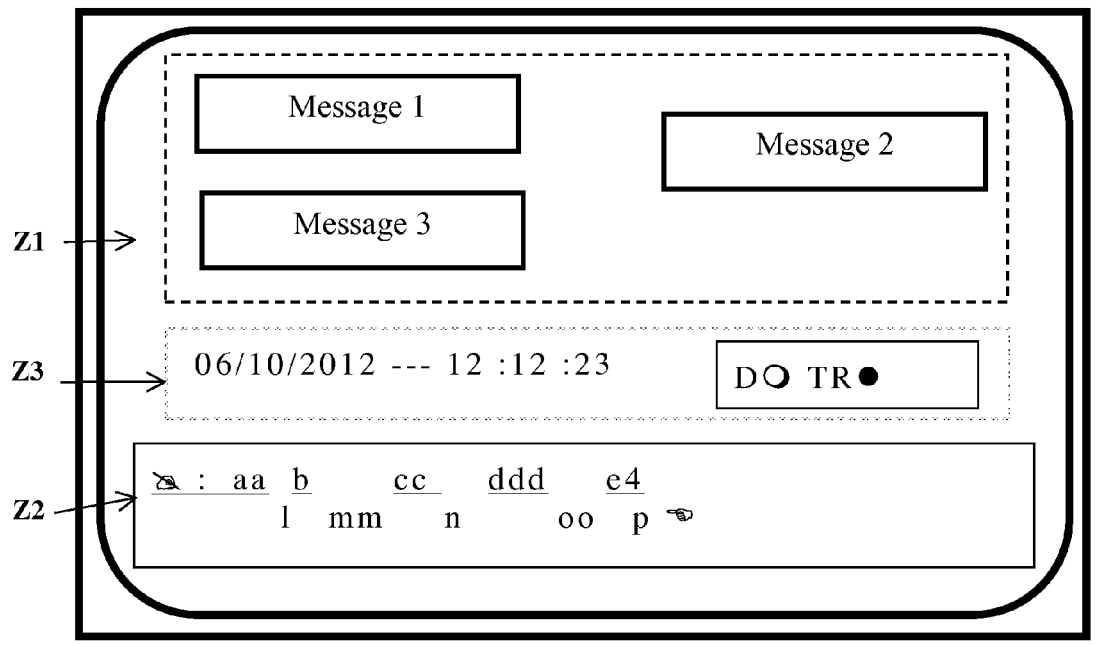
Figure 4:
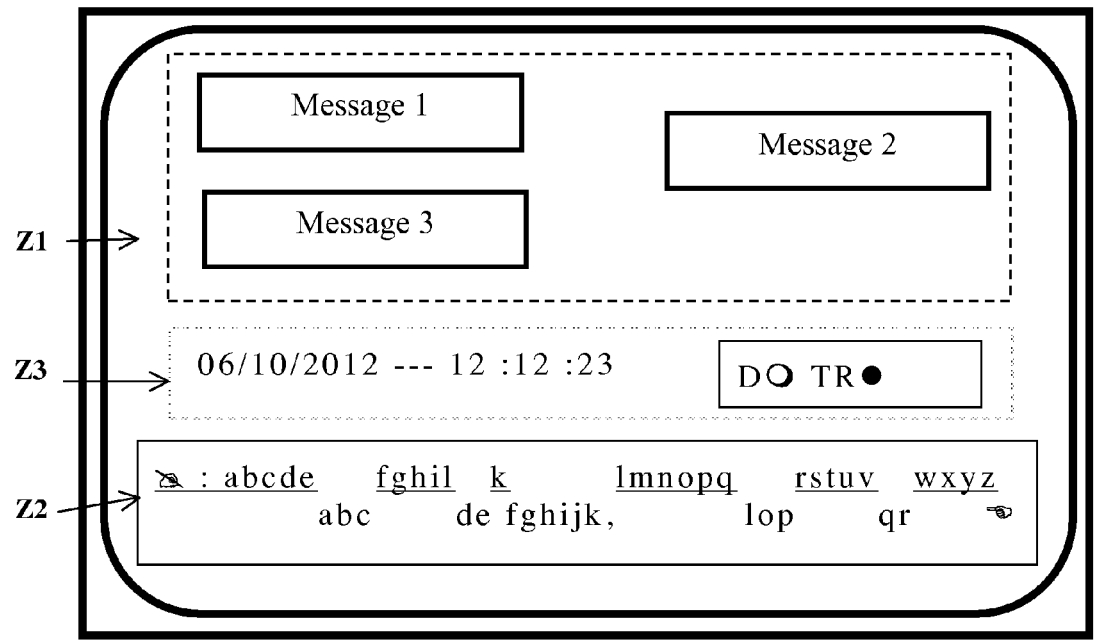
Figure 3:
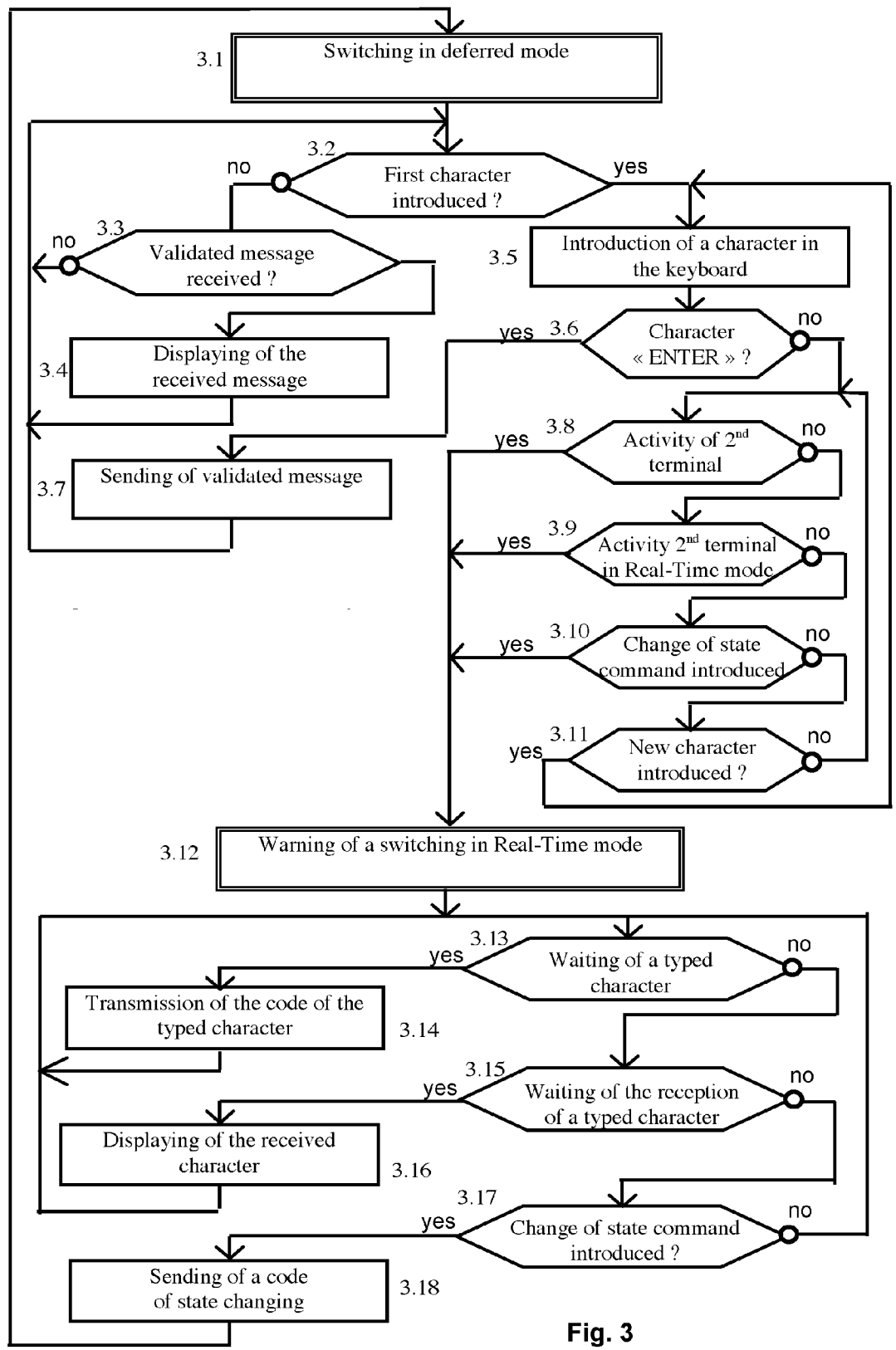

Other features and advantages of the invention shall appear more clearly from the following description of a particular embodiment, given by way of a simple illustratory and non-exhaustive example and from the appended drawings, of which:

FIG. 1 presents an example of architecture of a system in which the method according to the invention is implemented, FIG. 2 illustrates an example of an appearance of a messaging screen according to a preferred embodiment of the invention, FIG. 3 shows an example of a flowchart presenting the steps of a method for communicating text messages according to the invention, FIG. 4 illustrates a particular example of an appearance of a messaging screen according to one alternative embodiment of the invention.

6. DESCRIPTION OF ONE EMBODIMENT OF THE INVENTION 6.1 General Principle

The general principle of the invention relies on a communication of text messages which, initially, are exchanged in deferred mode between at least two terminals. In this mode, the content of the message is sent by its sender only when it is validated. The message transmitted is displayed as soon as it is received on the recipient's terminal. During the communication, the terminals exchange messages to detect whether the characters of non-validated messages are introduced into terminals at the same time. In this case, the terminals switch into a mode known as a "real-time" mode where each character or string of characters typed on a keypad is immediately transmitted to the recipient of the message very shortly after being introduced. The characters are displayed then in real time on the recipient's terminal. Advantageously, a visual indication of the passage from deferred mode into real-time mode appears on each terminal. Similarly, the presentation of the characters introduced into each terminal on the screens of these terminals takes account of the chronology of their introduction. Thus, the invention improves interactivity between interlocutors and optimizes the bandwidth in switching between a deferred mode and a real-time mode at an appropriate time.

6.2 General Description of an Embodiment

FIG. 1 presents a diagram of a system enabling two-way communications between at least two interlocutors. The main elements of the system are:

a first terminal 1 belonging to a first interlocutor,
a second terminal 2 belonging to a second interlocutor,
a network 3 used to transfer data between the terminals,
a server 4 for the management of the transfers.

The communications network 3 may be wired or wireless, of the Internet type for example, permitting communications by text messages. The terminals 1 and 2 may be identical or different. They are typically portable telephones, network-connected computers, wireless tablets, or any communications apparatus connected to a display device and possessing a text acquisition means. FIG. 1 presents an example of an embodiment of these terminals. Such terminals comprise at least one central processing unit 5 connected to a program module 6 and a data memory 7 which can take the form of a hard disk. An interface 8 enables communications with the communications network 3, and this interface is managed by a program module stored in the memory 6.

The terminals 1 and 2 have a man/machine interface UI 9 connected to a keypad 10 and a screen 11. The keypad 10 has keys for introducing alphanumerical characters which, in the form of a string of characters, constitute a message. The keypad also comprises a validation key, the text of which is "enter" for example, used to validate the string of characters that have just been typed as a message. The keyboard 10 may be separate or integrated into the terminal. This is the case for example when the terminal is a portable telephone. In the same way, the keyboard may be tactile thus offering the possibility of displaying icons which the user can select with a mouse. Characters and words may also be entered through a voice recognition system or motion recognition system. The screen 11 can be separate or integrated into the terminal. The management of the screen 11 and of the keyboard 10 and especially the generating of the menus displayed is done by a program module recorded in the memory 6. These menus appear on the entire screen or in a window occupying only a part of the screen. The generation of menus is integrated into the messaging program that the user selects by means of an applications browser. The user interface 9 sends out video signals on the display screen 11 and receives data introduced by the user on the keyboard 10.

The management server 4 of the network is conventional per se and does not need to be described in further detail.

After having described the different elements forming the invention in detail, we shall now explain how they cooperate with each other.

6.3 Presentation of Menus Introducing Messages

FIG. 2 presents an example of the appearance of a menu for introducing messages according to a preferred embodiment of the invention, the terminals 1 and 2 being then in deferred mode. Such a menu is generated by the messaging program stored in the program memory 6 in combination with the central processing unit 5 and by the user interface 9.

The displayed menu comprises at least the following three zones:
  a zone Z1 for displaying validated messages,
  a zone Z2 for introducing current messages,
  a state and control zone Z3.

The zone Z1 displays validated messages, preferably on two columns. The left-hand column presents messages sent by the user of the terminal. The right-hand column presents messages received by the interlocutor or interlocutors of the terminal. If there are several interlocutors, each message is graphically associated with an identifier of its sender, his name for example.

The zone Z2 displays the two messages being introduced. The menu of the zone Z2 is divided into two parts represented in FIG. 2 by two lines. The upper line enables the user of the terminal to introduce his message and the lower line displays the characters typed out by his interlocutor. According to one particular embodiment, to show that the upper line enables the user to introduce a text, the message is preceded by an icon and the characters typed are assigned a particular graphic feature, the "underline" feature for example. The user introduces his text into the zone Z2 until he validates it by action on a key "ENTER" for example, or by selecting an icon.

The lower line of the zone Z2 enables the user of the terminal to know the message that his interlocutor is introducing. According to one particular embodiment, to show that the upper line enables the user to introduce a text, the message is followed by an icon and the characters typed may be assigned another particular graphic feature, flashing for example.

According to one preferred embodiment, the presentation of the characters of the two lines takes account of the chronology of their introduction. For example, the characters introduced are displayed from left to right and one after the other according to the time of their introduction. A single character is present on a vertical line. Looking at the lower line of Z2, the user sees the characters that his interlocutor is typing when he himself is typing his own characters.

It goes without saying that several lines are displayed if the user is in communication with several interlocutors.

Other embodiments are possible. For example a single line is displayed and the origin of the characters (either typed by the user or received by an interlocutor) is identified by a color or any other graphic distinction.

The zone Z3 is used to display the current communication mode and, at the same time, introduce a command for changing modes and provide information on general information related to the communication, the date and time for example. According to the example of FIG. 2, the zone Z3 contains two selectable icons marked "D" for "deferred" and "TR" for real time. FIG. 2 shows a terminal in RT mode.

It goes without saying that FIG. 2 presents an example of a menu and that other ways of representing the zones described here above are possible.

6.4 Presentation of Steps of the Method

An example of an implementation of the communications method according to the invention is represented by the flowchart of FIG. 3. Each step of this method is specifically described here below and enables the management of the communication between at least two interlocutors.

Initially, the user turns his terminal 1 on and launches his messaging module by choosing one or more interlocutors. The messaging module calls the interlocutor or interlocutors and, as soon as communication is set up with a terminal 2, the menu illustrated in FIG. 2 appears on the screens with the blank message zones. At the step 3.1, the communications is in deferred mode. In abbreviated form, in the remainder of this document, this mode is designated as the mode D. In this mode, the terminal 1 sends the content of an introduced message only when this message is validated by a validation character. Then, at the step 3.2, the message module makes a test to see whether a first character of a message is introduced on the keyboard 10 of the terminal 1. If this is not the case, the module makes a test to see whether a validated message is received from a terminal 2 (step 3.3). If this is not the case, the module loops back pending either the introduction of a character at the keyboard or the reception of a message coming from a terminal 2. If a validated message is received, the module displays it in the zone Z1 (step 3.4) and loops back as here above.

At the step 3.2, if a character is introduced by the user, then the module displays it in the zone Z2 and sends a work signal indicating the introduction of a character at the keypad (step 3.5). In this mode D, the work signal does not need to contain the code of the character introduced.

At the step 3.6, the message module analyses the characters introduced by the user and compares it with a validation character, "ENTER" for example. In one variant, the validation is done at the end of a timeout period: if the user has not introduced a new character at the end of a determined duration, five seconds for example, then the previously introduced string of characters becomes a validated message. If the character corresponds to a validation, the set of characters introduced is validated and is displayed in the zone Z1, the zone Z2 then becoming vacant. At the same time, the user's terminal 1 sends the terminal 2 the validated message (step 3.7). The message received by the terminal 2 is immediately displayed and appears in the zone Z1 of the screen of the terminal 2.

At the step 3.8, the messaging program tests to see whether the interface 8 has received a signal from the terminal 2 providing information on the activity of the second terminal. This signal indicates for example that the interlocutor has just introduced at least one character on his terminal. In the prior art, the reception of such a work signal activates the display of an icon indicating that the interlocutor is in the process of responding. At this stage of the sequence of the steps, a message is being prepared at the terminal 1 and therefore the terminals will change communications modes. If this is not the case, the messaging program makes a test to see whether the interface 8 has received a state-changing command from the terminal indicating that at least one terminal 2 has switched into real-time (RT) mode (step 3.9). If this is not the case, the messaging program tests to see whether the user has introduced a change of state command to manually switch his terminal into RT mode (step 3.10). If this is not the case, the messaging module waits for a new character to concatenate with the message being composed (step 3.11) and loops-back to the step 3.8, 3.9, 3.10 and 3.11 so long as the responses are negative. If a new character is introduced, the module skips the step 3.5 for displaying the character introduced and for sending a work signal.

In this scheme of the running of the steps, it can be noticed that a user can send several valid messages without receiving any response while remaining in the same communications mode.

If a response to the steps 3.8, 3.9 or 3.10 is positive, the user's terminal 1 switches into RT mode and sends a signal to the interlocutors' terminals to provide information on the change of state (step 3.12). In response to this signal, all the terminals of the interlocutors will switch into RT mode. If the terminal 1 has received a signal indicating that a terminal 2 has switched into RT mode, then it is unnecessary to send such a signal since it has already been sent out by the terminal 2. According to one alternative embodiment, the switching into mode RT takes place during a positive response at the step 3.8 and after a determined duration during which at least one other activity signal is effectively received. This duration is for example 30 seconds. This variant avoids the need for the terminals to swiftly oscillate between the states D and RT. In this way, the changes of state can take place only after the determined duration.

In this scheme, as soon as the signal indicating that the terminal 1 has passed into RT mode is received, the interlocutors' terminal 2 also passes into RT mode. At the step 3.12, the terminal 1 warns its user that the communication mode of his terminal is now in real time. This information is made by a change in the zone Z3. It is the icon RT that is graphically highlighted and the icon D that is no longer highlighted. At the step 3.13, the messaging module is waiting for a typed character. If the user types a character on the keypad, the messaging module displays this character in the upper part of the zone Z2 and sends the terminal 2 a work signal which, in the RT mode, contains the code of the character typed (step 3.14). If the character is the message validation character, the message displayed in the zone Z2 is transferred to the zone Z1. This is also the case at the screen of the interlocutors' terminal 2. At the step 3.15, the messaging module waits for a received character. If the terminal 1 receives a sign containing a character introduced at a terminal 2 (step 3.15), then the character received is displayed at the upper part of the zone Z2 (step 3.16). If, at the step 3.17, the user introduces a command for changing states and passing into deferred mode, then the messaging program switches into deferred mode and sends a signal to the interlocutors' terminals to inform them of the change in state (step 3.18). Upon reception of this last signal, the other terminals participating in the communication also switch into D mode. It shall be seen here below that other events activate the switching from RT mode into D mode.

The messaging program constantly loops back to the steps 3.13, 3.15 and 3.17 so long as a command is not introduced or so long as a work signal has not been received from an interlocutor's terminal 2.

According to one particular aspect of the invention, the terminal in mode D sends out work signals without the code of the typed character and, when the user validates the succession of characters introduced, this terminal transmits all the codes of the characters constituting the validated message. In the mode TR, the work signal contains the code of the character typed. From the viewpoint of the communication, the validation character is considered to be any character whatsoever. However, from the viewpoint of the display, it activates the transfer of the message from the zone Z2 to the zone Z1.

In the above description, a user decides to return to deferred mode by introducing a command on the keypad. According to a first variant, the absence of reception of a work signal during the introduction of a message in full activates the return to deferred mode. According to one improvement, it is possible to program the number of messages during which no work signal is received to switch into mode D. According to another variant, the return to deferred mode is activated for all the connected terminals by an absence of signals exchanged between the terminals for a determined period, one minute for example. Whatever the variant of the embodiment, the interlocutors are informed of an automatic switching by extinction of the icon TR and the lighting up of the icon D.

6.4 Variants of the User Interface

According to one variant illustrated in FIG. 4, in RT mode, the sending of a work signal is activated by the introduction of a word formed by one or more alphanumerical characters and enclosed between two separating characters. The separating characters are displayable characters which are not alphanumerical. Typically, they contain the space bar, the punctuation characters, the validation character, etc.

The user of the terminal 1 introduces the message formed by the following words: "abcde", "fghil", "k" "lmnop" "rstux", "wxyz" separated by blanks or punctuation characters. At the same instants, his interlocutor has also introduced other words on his terminal 2: "abc", "de", "fghijk", "lop", etc. The zone Z2 displays on two lines the words typed by the user and the words received from his interlocutor. The fact of no longer cutting up the words into characters enables better readability and therefore a better understanding of what the interlocutor is currently typing. Just as in the case of FIG. 2, the presentation of the words on the two lines takes account of the chronology of their introduction.

According to another variant, in RT mode, the sending of a work signal is activated by the introduction of a predetermined number N of characters of the message, N being greater than or equal to 2. In this variant, in RT mode, the characters of the message are transmitted in the work signal as soon as the user of the terminal 1 has introduced N characters of the message. For example, in this variant, in RT mode, the characters are transmitted two by two or three by three, etc. Here below, we describe the modified steps of the communications method according to this variant. The rest of the communications procedure remains identical to that of the embodiments described here above.

In this variant, at the step 3.13, following the switching in the RT mode, a counter CPT of numbers of characters typed is set at zero. During the step 3.13, when the user types a character on the keyboard, the counter CPT is incremented by 1. Then, during the step 3.14, the messaging module displays the typed character in the zone Z2 and verifies that the counter CPT has reached the predetermined number N of characters or that the typed character corresponds to the validation character. If none of these conditions is verified, the messaging module returns to the step 3.13 pending a typed character. If the counter CPT reaches the predetermined number N of typed characters or if the typed character corresponds to the validation character, the messaging module sends the terminal 2 a work signal that contains the code of the characters typed since the switching into RT mode or since the transmission of the previous work signal to the terminal 2. The counter CPT is then reset at zero. In a manner similar to that of the other particular embodiments of the invention, if the typed character is that of validation of the message, the message displayed in zones Z2 is transferred into zone Z1. This is also the case at the screen of the interlocutors' terminals 2. At the step 3.15, the messaging module awaits a predetermined number N of received characters. If the terminal 1 receives a signal containing the predetermined number N of characters introduced into a terminal 2 (step 3.15), then the characters received are displayed at the lower part of the zone Z2 (step 3.16).

According to one improvement, the messaging module comprises command buttons enabling the characters of the upper parts or lower parts of the zone 2 to be highlighted to a greater or lesser extent. These command buttons make it possible to more clearly distinguish the characters and words typed by the user from the characters and words received from the interlocutor. The distinction consists for example in attenuating the brightness of the elements of one part and increasing the brightness of the elements of the other part.

The invention claimed is:

1. A method comprising: communicating text messages between a first terminal and a second terminal that are connected by a communications network, comprising:
a first communication mode in which all the characters of a validated message are transmitted from the first terminal to the second terminal, the transmission of all the characters being activated by a validation of said message,
a second communication mode coming into action when a message is being introduced into the first terminal and following reception of a signal indicating a simultaneous introduction of at least one character into a second terminal, the second communication mode comprising transmitting from the first terminal to the second terminal:
each character of a message, the transmission of each character being activated by its introduction into the first terminal, or
a word of a message, said word being composed of one or more alphanumerical characters and being enclosed between two separating characters, the transmission of said word being activated by its introduction into the first terminal.

2. The method for communicating text messages according to claim 1, wherein the second communication mode comes into action after a determined duration during which at least one other activity signal is received by the first terminal.

3. The method communicating text messages according to claim 1, wherein the method comprises introducing a command to switch the first terminal from the second communication mode to the first communications mode.

4. The method communicating text messages according to claim 1, wherein the second communication mode comes into action through absence of an activity signal sent by the second terminal during the introduction of a message in full.

5. The method communicating text messages according to claim 1, wherein the second communication mode comes into action through absence of reception of an activity signal sent by the second terminal for a determined duration.

6. The method communicating text messages according to claim 1, wherein the method comprises a displaying a menu for introducing messages comprising a zone displaying the messages being introduced and, in the second communications mode, said zone displays the characters introduced into the first terminal and the characters introduced into the second terminal and distinguishes them by a graphic distinction.

7. The method communicating text messages according to claim 6, wherein the presentation of the characters in said zone complies with the chronology of the introduction of the characters into the first terminal and the introduction of characters into the second terminal.

8. The method communicating text messages according to claim 1, wherein the second communication mode comes into action by sending by this terminal a signal informing the second terminal that it is to switch into the second communications mode.

9. A communications terminal comprising:
a communication interface configured to communicate with at least one other terminal through a communications network;
a keypad configured to introduce characters for creating messages to be transmitted to at least one other terminal; and
two communications modes available, a first mode comprising transmitting all the characters when the message is validated by the keypad, and a second communication mode coming into action when a message is being introduced into the first terminal and following reception of a signal indicating a simultaneous introduction of at least one character into a second terminal, the signal providing information on activity of the second terminal, the second communication mode comprising transmitting:
each character of a message when it is introduced into the keypad; or
a word of a message, said word being composed of composed of one or more alphanumerical characters and enclosed between two separating characters, during its introduction into the keypad.

10. A non-transitory computer-readable medium comprising program code instructions to communicate text messages between a first terminal and a second terminal, when this program is executed by a processor of the first terminal, the first terminal and the second terminal being connected by a communications network, and wherein the instructions comprise:
- instructions that implement a first communication mode in which all characters of a validated message are transmitted from the first terminal to the second terminal, the transmission of all the characters being activated by a validation of said message,
- instructions that implement a second communication mode coming into action-when a message is being introduced into the first terminal and following reception of a signal indicating a simultaneous introduction of at least one character into the second terminal, the second communication mode comprising transmitting from the first terminal to the second terminal:
- each character of a message, the transmission of each character being activated by its introduction into the first terminal, or
- a word of a message, said word being composed of one or more alphanumerical characters and being enclosed between two separating characters, the transmission of said word being activated by its introduction into the first terminal.

* * * * *